United States Patent
Ballagas et al.

(10) Patent No.: US 11,853,472 B2
(45) Date of Patent: Dec. 26, 2023

(54) MODIFY AUDIO BASED ON PHYSIOLOGICAL OBSERVATIONS

(71) Applicant: Hewlett-Packard Development Company, L.P., Spring, TX (US)

(72) Inventors: Rafael Antonio Ballagas, Palo Alto, CA (US); Sunil Ganpatrao Bharitkar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 87 days.

(21) Appl. No.: 17/414,148

(22) PCT Filed: Apr. 5, 2019

(86) PCT No.: PCT/US2019/025931
§ 371 (c)(1),
(2) Date: Jun. 15, 2021

(87) PCT Pub. No.: WO2020/204934
PCT Pub. Date: Oct. 8, 2020

(65) Prior Publication Data
US 2022/0026986 A1  Jan. 27, 2022

(51) Int. Cl.
G06F 3/01 (2006.01)
H04R 5/04 (2006.01)
H04S 7/00 (2006.01)

(52) U.S. Cl.
CPC .............. *G06F 3/013* (2013.01); *G06F 3/015* (2013.01); *H04R 5/04* (2013.01); *H04S 7/302* (2013.01); *H04S 2420/01* (2013.01)

(58) Field of Classification Search
CPC .......... G06F 3/011; G06F 3/017; G06F 3/013; G06F 3/015; G06F 3/012; G06F 3/0346;
(Continued)

(56) References Cited

U.S. PATENT DOCUMENTS 8,319,819 B2 * 11/2012 MacDonald ........... H04N 7/142
348/14.09
9,693,009 B2  6/2017 Farrell et al.
(Continued)

FOREIGN PATENT DOCUMENTS

WO  WO-2018050959 A1  3/2018
WO  WO-2018182274 A1  10/2018
(Continued)

OTHER PUBLICATIONS

Spatial Workstation User Guide—Facebook Audio 360, Retrieved from the Internet on Feb. 26, 2019; https://facebookincubator.github.io/facebook-360-spatial-workstation/Documentation/SpatialWorkstation/SpatialWorkstation.html.

*Primary Examiner* — William Lu
(74) *Attorney, Agent, or Firm* — Quarles & Brady LLP

(57) ABSTRACT

An example non-transitory computer-readable storage medium comprises instructions that, when executed by a processing resource of a computing device, cause the processing resource to, responsive to identifying a spatial area of attention of a gaze of a user, enhance audio associated with the spatial area of attention. The instructions further cause the processing resource to modify the enhancing based at least in part on a physiological observation of the user while hearing the audio.

14 Claims, 3 Drawing Sheets

(58) Field of Classification Search
CPC ......... G06F 3/167; G06F 3/165; H04R 1/406; H04R 3/005; H04R 5/027; H04R 3/00; H04R 5/04; H04S 1/007; H04S 7/304; H04S 7/302; H04S 2420/01; A61F 11/04; G10L 15/26

See application file for complete search history.

(56) References Cited

U.S. PATENT DOCUMENTS

| | | | | |
|---|---|---|---|---|
| 9,699,583 | B1* | 7/2017 | Lyren | H04S 7/303 |
| 9,740,452 | B2 | 8/2017 | Vennstrom et al. | |
| 9,906,885 | B2 | 2/2018 | Visser et al. | |
| 10,027,888 | B1* | 7/2018 | Mackraz | H04N 13/383 |
| 10,055,191 | B2 | 8/2018 | Vennstrom et al. | |
| 10,209,773 | B2 | 2/2019 | Khaderi et al. | |
| 10,300,370 | B1 | 5/2019 | Amihood | G06F 3/011 |
| 10,841,724 | B1* | 11/2020 | Tran | G06F 3/011 |
| 11,057,720 | B1* | 7/2021 | Frieding | G06F 3/012 |
| 2006/0224046 | A1 | 10/2006 | Ramadas et al. | |
| 2008/0065468 | A1* | 3/2008 | Berg | G06Q 30/02 705/7.32 |
| 2013/0307771 | A1 | 11/2013 | Parker et al. | |
| 2014/0126877 | A1* | 5/2014 | Crawford | G11B 27/105 386/E5.002 |
| 2014/0287806 | A1* | 9/2014 | Balachandreswaran | A63F 13/428 463/7 |
| 2014/0347265 | A1 | 11/2014 | Aimone et al. | |
| 2016/0077547 | A1* | 3/2016 | Aimone | A61B 5/1114 345/8 |
| 2016/0262608 | A1* | 9/2016 | Krueger | G16H 40/63 |
| 2017/0243600 | A1* | 8/2017 | Teshima | G10L 25/51 |
| 2017/0277257 | A1* | 9/2017 | Ota | G02B 27/017 |
| 2017/0289219 | A1* | 10/2017 | Khalid | H04N 21/816 |
| 2017/0346817 | A1* | 11/2017 | Gordon | G06V 40/10 |
| 2018/0007489 | A1* | 1/2018 | Lehtiniemi | G06F 3/165 |
| 2018/0008141 | A1* | 1/2018 | Krueger | A61B 3/0025 |
| 2018/0146198 | A1* | 5/2018 | Atluru | H04N 19/167 |
| 2018/0197429 | A1* | 7/2018 | Hwang | G09B 19/167 |
| 2021/0055367 | A1* | 2/2021 | Poore | G01S 3/8083 |
| 2022/0270570 | A1* | 8/2022 | Welsch | G06F 1/3218 |
| 2023/0054579 | A1* | 2/2023 | Wang | G06F 3/013 |

FOREIGN PATENT DOCUMENTS

| | | |
|---|---|---|
| WO | WO-2018194320 A1 | 10/2018 |
| WO | 2018/218356 A1 | 12/2018 |

* cited by examiner

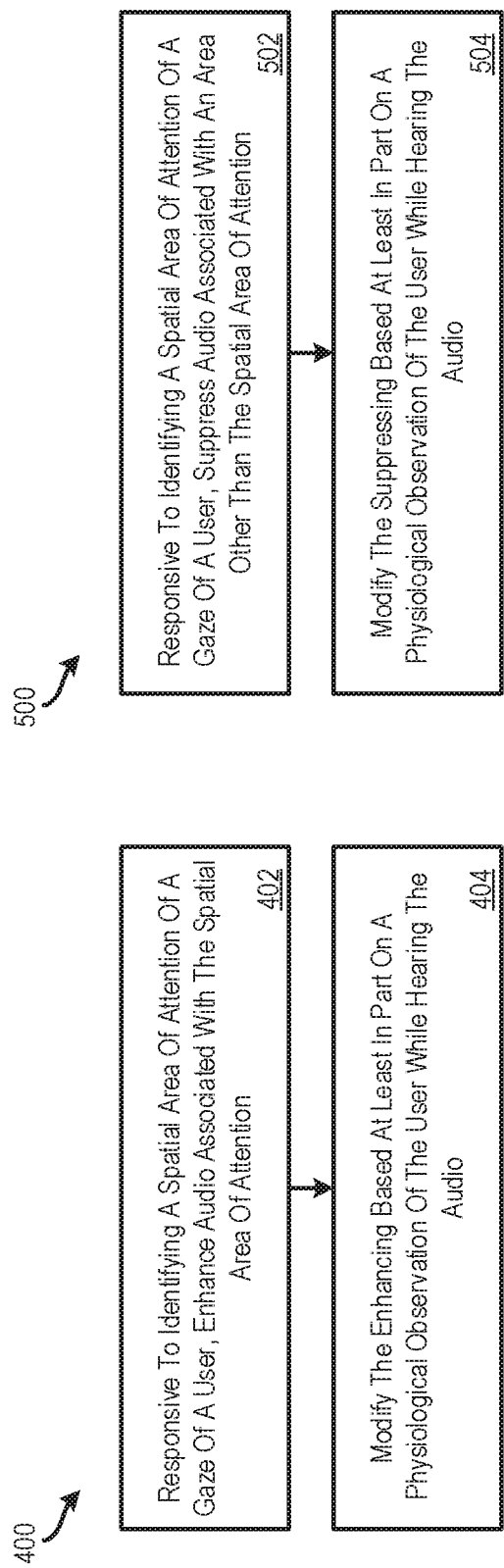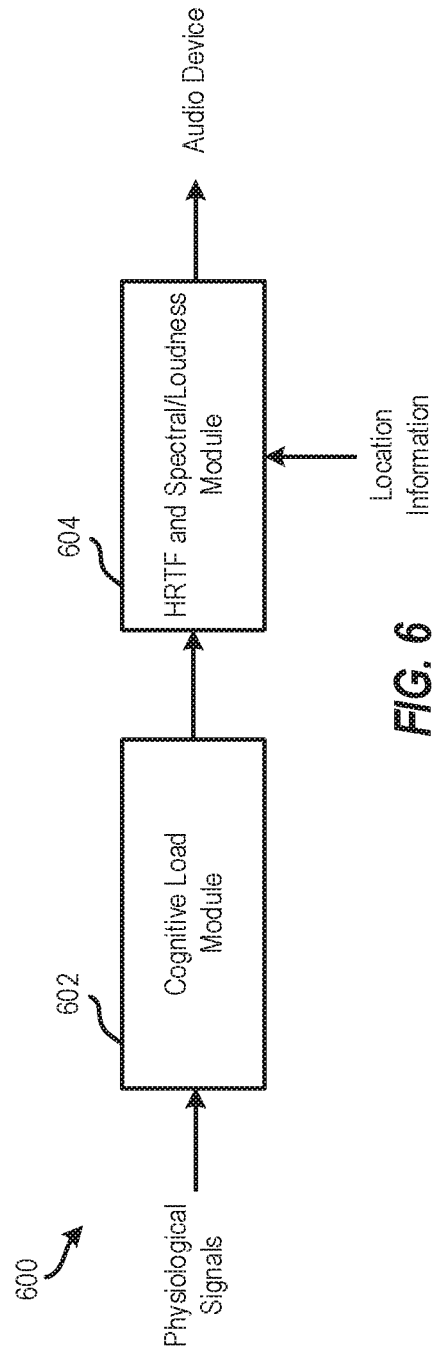

MODIFY AUDIO BASED ON PHYSIOLOGICAL OBSERVATIONS

BACKGROUND

A virtual reality environment creates an imaginary environment or replicates a real environment as a virtual, simulated environment. To do this, a combination of software and hardware devices provide auditory, visual, and other sensations to a user to create the virtual reality environment. For example, a virtual reality headset provides auditory and visual sensations that simulate a real environment.

Augmented reality environments are also created by a computing device utilizing a combination of software and hardware devices to generate an interactive experience of a real-world environment. The computing device augments the real-world environment by generating sensory information (e.g., auditory, visual, tactile, etc.) and overlaying it on the real-world environment.

BRIEF DESCRIPTION OF THE DRAWINGS

The following detailed description references the drawings, in which:

FIG. 4 depicts a flow diagram of a method that modifies audio based on physiological observations according to examples described herein;

FIG. 5 depicts a flow diagram of a method that modifies audio based on physiological observations according to examples described herein; and FIG. 6 depicts a flow diagram of a method that modifies audio based on physiological observations according to examples described herein.

DETAILED DESCRIPTION

Figure 1:
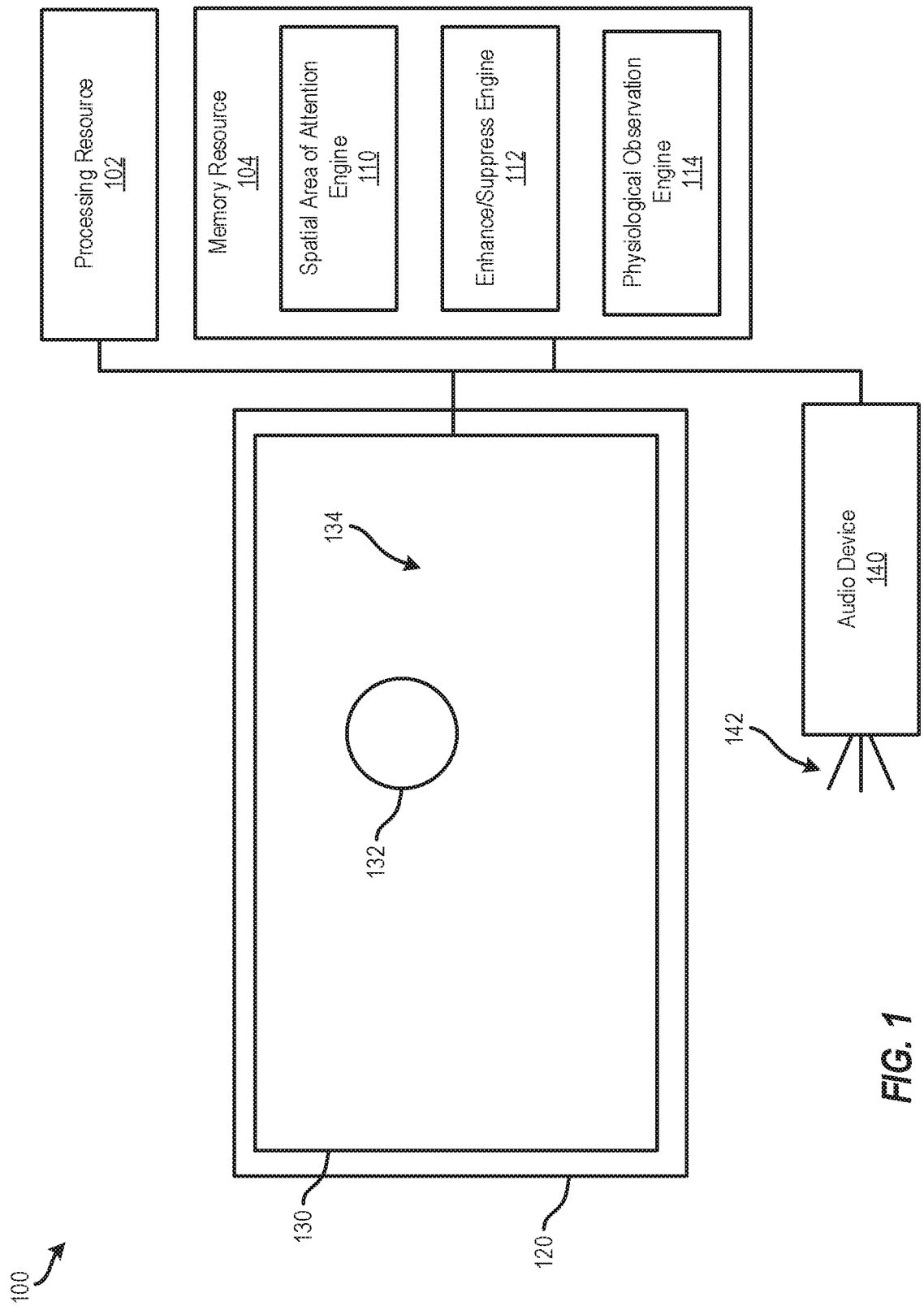
FIG. 1 depicts a computing device having a display to present an interface and an audio device to generate audio according to examples described herein.

Digital environments, like virtual reality environments, augmented reality environments, and gaming environments, provide auditory, visual, tactical, and other sensations to users to create an immersive experience for the user. For example, in a virtual reality environment, a virtual reality headset worn over a user's eyes immerses the user in a visual environment. An audio device, such as speakers or headphones, provides audio associated with the visual environment. A user's immersive experience can be diminished by a user's inability to focus auditory attention (an effect of selective attention in the brain) on a particular stimulus while filtering out a range of other stimuli. For example, a user may have difficulty focusing auditory attention to sounds associated with a spatial area of attention (i.e., where the user is looking on a display).

Examples described herein provide for modifying audio associated with a spatial area of attention of a user based on psychological observations of the user while hearing the audio. In digital environments like those described herein, it may be useful to focus auditory attention on a particular spatial area of attention. For example, when a user looks at a spatial area of attention (e.g., at a person talking among a group of individuals), examples described herein provide for enhancing audio associated with the spatial area of attention. Enhancing audio can include applying filters to suppress noise or interfering sources, increase volume, improve speech quality or intelligibility through formant enhancement, etc.

Additional examples described herein also provide for suppressing audio associated with areas other than the spatial area of attention. For example, audio emitted from sources outside the spatial area of attention can be reduced in volume, minimized in terms of intelligibility, etc. In some examples, enhancing audio for a spatial area of attention can be performed in combination with suppressing audio associated with areas other than the spatial area of attention.

Further examples described herein provide for observing the physiological conditions of the user and applies those physiological observations to modify the enhancing and/or suppressing. For example, if the user is observed to display signs of not understanding audio (e.g., the user raises an eyebrow, the user turns an ear towards the spatial area of attention, etc.), the enhancing and/or suppressing can be modified to increase the user's hearing/understanding of the audio. As one such example, audio associated with the spatial area of attention is amplified when the user's cognitive load is high. This reduces the user's overall cognitive workload. Cognitive workload can be computed or estimated from measurements obtained from pupil data, electroencephalogram (EEG) sensing, electrocardiogram (ECG) sensing, photoplethysmogram (PPG) sensing, functional magnetic resonance imaging (fMRI) sensing, and the like.

In yet additional examples, the present techniques provide for diverting audio attention away from the spatial area of attention. For example, when a user closes his/her eyes, audio attention is directed behind the user instead of to the spatial area of attention.

Figure 3:
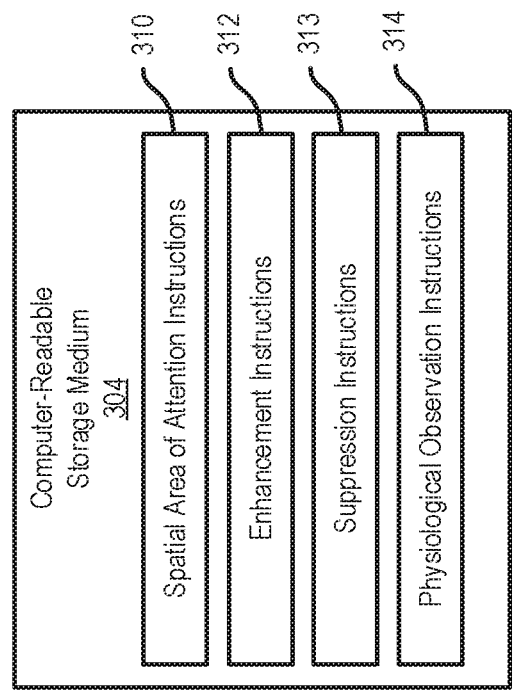
FIG. 3 depicts a computer-readable storage medium 304 comprising instructions to modify audio based on physiological observations according to examples described herein.
Figure 2:
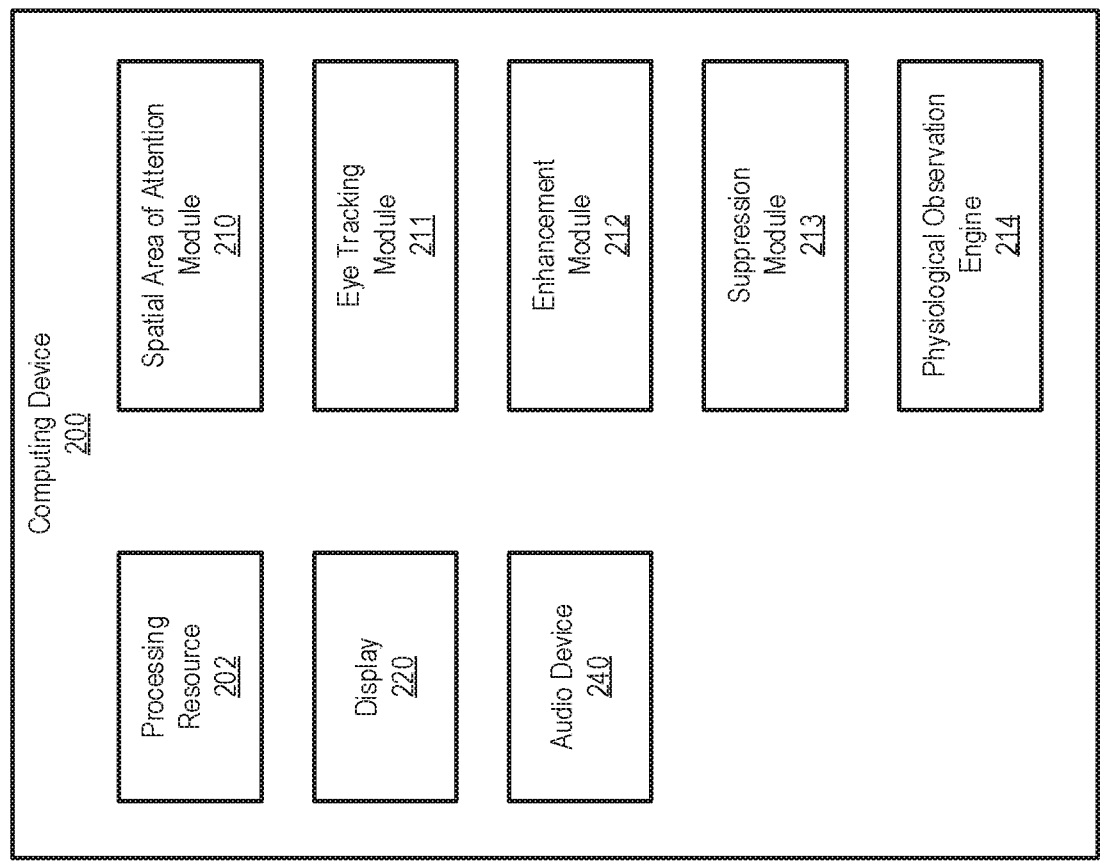
FIG. 2 depicts a computing device having a display to present an interface and an audio device to generate audio according to examples described herein.

FIGS. 1-3 include components, modules, engines, etc. according to various examples as described herein. In different examples, more, fewer, and/or other components, modules, engines, arrangements of components/modules/engines, etc. can be used according to the teachings described herein. In addition, the components, modules, engines, etc. described herein are implemented as software modules executing machine-readable instructions, hardware modules, or special-purpose hardware (e.g., application specific hardware, application specific integrated circuits (ASICs), field programmable gate arrays (FPGAs), embedded controllers, hardwired circuitry, etc.), or some combination of these.

FIGS. 1-3 relate to components, engines, and modules of a computing device, such as a computing device 100 of FIG. 1 and a computing device 200 of FIG. 2. In examples, the computing devices 100 and 200 are any appropriate type of computing device, such as smartphones, tablets, desktops, laptops, workstations, servers, smart monitors, smart televisions, digital signage, scientific instruments, retail point of sale devices, video walls, imaging devices, peripherals, networking equipment, wearable computing devices, or the like.

FIG. 1 depicts a computing device 100 having a display 120 to present an interface 130 and an audio device 140 to generate audio 142 according to examples described herein. The computing device 100 includes a processing resource 102 that represents any suitable type or form of processing unit or units capable of processing data or interpreting and executing instructions. For example, the processing resource 102 includes central processing units (CPUs), microprocessors, and/or other hardware devices suitable for retrieval and execution of instructions. The instructions are stored, for example, on a non-transitory tangible computer-readable storage medium, such as memory resource 104 (as well as computer-readable storage medium 304 of FIG. 3), which may include any electronic, magnetic, optical, or other physical storage device that store executable instructions. Thus, the memory resource 104 may be, for example, random access memory (RAM), electrically-erasable programmable read-only memory (EEPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions are stored during runtime, and a secondary memory, such as a nonvolatile memory in which a copy of the instructions is stored.

Alternatively or additionally in other examples, the computing device 100 includes dedicated hardware, such as integrated circuits, ASICs, Application Specific Special Processors (ASSPs), FPGAs, or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

The display 120 represents generally any combination of hardware and programming that exhibit, display, or present a message, image, view, interface, portion of an interface, or other presentation for perception by a user of the computing device 100. In examples, the display 120 may be or include a monitor, a projection device, a touchscreen, and/or a touch/sensory display device. For example, the display 120 may be any suitable type of input-receiving device to receive a touch input from a user. For example, the display 120 may be a trackpad, touchscreen, or another device to recognize the presence of points-of-contact with a surface of the display 120. The points-of-contact may include touches from a stylus, electronic pen, user finger or other user body part, or another suitable source. The display 120 may receive multi-touch gestures, such as "pinch-to-zoom," multi-touch scrolling, multi-touch taps, multi-touch rotation, and other suitable gestures, including user-defined gestures.

The display 120 can display text, images, and other appropriate graphical content, such as an interface 130 of an application. In the example shown in FIG. 1, a presentation engine (not shown) causes the display 120 to present the interface 130. For example, when an application executes on the computing device 100, the presentation engine presents the interface 130 on the display 120.

The audio device 140, such as an electroacoustic transducer (i.e., speaker), generates audio 142 by converting a signal from the computing device 100 to a sound wave that the user of the computing device 100 can hear. Different types of audio devices can be used, such as a loudspeaker, headphones, and the like.

In examples, the audio 142 corresponds to or is otherwise associated with the content of the interface 130 presented on the display 120. For example, if the interface 130 shows an outdoor scene, the audio 142 may include the sounds of birds, wind, rain, or other outdoor sounds. As another example, if the interface 130 shows a sporting event, the audio 142 may include sounds of dialog of commentators or analysts, crowd noise, player noise, a referee's whistle, and the like.

Spatial audio delivers immersive audio to a user using, for example, head related transfer functions (HRTFs). The HRTFs create the delays and signal attenuation that help a user perceive distance and direction of an audio source. The computing device 100 of FIG. 1, for example, improves spatial audio enhancing audio associated with a spatial area of attention and/or suppressing audio associated with areas other than the spatial area of attention. The computing device 100 further improves spatial audio by modifying the enhancement and/or suppression based on physiological observations of a user while the user is listening to audio.

The spatial area of attention engine 110 identifies a spatial area of attention 132 of a user based on a gaze of the user, a head direction of the user, or another directional indicator of the user. For example, the spatial area of attention engine 110 uses eye tracking techniques or other suitable techniques to determine the spatial area of attention 132. The spatial area of attention 132 represents an area to which the user has focused his or her gaze. For example, in the case of the interface 130, the spatial area of attention 132 is an area (or portion) of the interface 130 to which the user has focused his or her gaze. Areas outside the spatial area of attention 132 are referred to as areas 134 other than the spatial area of attention 132. In other examples, the spatial area of attention engine 110 identifies the spatial area of attention 132 by detecting an orientation of a head of the user using sensors (e.g., positioning sensors, tilt sensors, accelerometers, gyroscopes, and the like).

The enhance/suppress engine 112 uses the spatial area of attention 132 to enhance audio associated with the spatial area of attention 132. For example, enhancing audio associated with the spatial area of attention 132 can include applying filters to the audio to remove noise, to improve clarity, to amplify the audio, and the like. This can be done in conjunction with cognitive load analysis, such that if the cognitive load is estimated to be high then the amount of suppression in the non-spatial attention area and the amount of enhancement in the spatial attention area can be adjusted to reduce the cognitive load below a predetermined threshold. As one such example, if the spatial area of attention 132 is focused on two individuals having a conversation, the audio can be enhanced to increase volume on frequencies within a voice frequency (e.g., from about 300 Hz to about 3400 Hz). This can improve the user's hearing and understanding of the conversation occurring within the spatial area of attention 132.

The enhance/suppress engine 112 also uses the spatial area of attention 132 to suppress audio associated with areas 134 other than the spatial area of attention 132. For example, suppressing audio associated with areas 134 other than the spatial area of attention 132 can include applying filters to audio associated with the areas 134 to reduce or eliminate such audio. As an example, if the spatial area of attention 132 is focused on the conversation of the above example, audio associated with the areas 134 can be suppressed, thereby improving the audio associated with the spatial area of attention 132. The enhance/suppress engine 112 can apply filters to lower the volume of audio associated with the areas 134, for example. This also improves the user's hearing and understanding of the conversation occurring within the spatial area of attention 132. In examples, audio associated with areas 134 other than the spatial area of attention 132 can be reduced but not entirely eliminated, which enables the user to continue to monitor the areas 134 other than the spatial area of attention 132 with low levels of attention.

The physiological observation engine 114 observes physiological responses of a user while hearing the audio (e.g., audio that has been enhanced/suppressed). For example, the physiological observation engine 114 can observe physiological responses that indicate that a user is struggling to understand or recognize audio associated with the spatial area of attention by estimating cognitive workload based on pupil dilation, heart rate, galvanic skin response, facial expression, brain activity, and the like, and combinations thereof. In response to a determined low understanding of audio associated with the spatial area of attention 132, the physiological observation engine 114 can cause the enhance/suppress engine 112 to modify the audio to improve understanding. For example, the enhance/suppress engine 112 may increase levels on the audio associated with the spatial area of attention 132, remove noise from the audio associated with the spatial area of attention 132, reduce levels on the audio associated with areas 134 other than the spatial area of attention 132, and the like.

In some examples, the physiological observation engine 114 uses electromyography (EMG) to detect a facial expression of the user to determine the user's understanding of the audio. For example, the physiological observation engine 114 uses EMG to detect a facial expression of the user that indicates confusion or lack of understanding. In response to detecting such confusion or lack of understanding, the physiological observation engine 114 can cause the enhance/suppress engine 112 to modify the audio to improve understanding, such as by modifying the enhancing/suppressing.

FIG. 2 depicts a computing device 200 having a display 220 to present an interface (e.g., the interface 130) and an audio device 240 to generate audio (e.g., the audio 142) according to examples described herein. Similarly to the computing device 100 of FIG. 1, the example computing device 200 of FIG. 2 includes a processing resource 202, the display 220, and the audio device 240.

Additionally, the computing device 200 includes a spatial area of attention module 210, an eye tracking module 211, an enhancement module 212, a suppression module 213, and a physiological observation engine 214. These modules may be stored, for example, in a computer-readable storage medium (e.g., the computer-readable storage medium 304 of FIG. 3) or a memory (e.g., the memory resource 104 of FIG. 1), or the modules may be implemented using dedicated hardware for performing the techniques described herein.

The display 220 presents an interface (e.g., a virtual reality interface, an augmented reality interface, a gaming interface, etc.) to a user.

The spatial area of attention module 210 identifies a spatial area of attention of a gaze of the user with respect to the virtual reality interface by tracking an eye movement of an eye of the user. The spatial area of attention module 210 can utilize the eye tracking module 211 to track the eye movements of eyes of the user.

The enhancement module 212 adjusts audio associated with the virtual reality interface by enhancing audio associated with the spatial area of attention. The suppression module 213 adjusts audio associated with the virtual reality interface by suppressing audio associated with an area other than the spatial area of attention.

The physiological observation engine 214 modifies at least one of the enhancing or suppressing based at least in part on a physiological observation of the user while hearing the audio.

According to examples, the spatial area of attention module 210 can identify a new spatial area of attention based on a user input (e.g., a user moving the user's gaze to the new area of attention from the prior area of attention, a hand gesture of the user, a head motion of the user, etc.). The enhancement module 212 can then enhance audio associated with the new spatial area of attention. Similarly, the suppression module 213 can suppress audio associated with an area other than the new spatial area of attention. The physiological observation engine 214 can then modify at least one of the enhancing or suppressing based at least in part on a second physiological observation of the user while hearing the audio associated with the new spatial area of attention.

In an example, the new spatial area of attention is an area not within the user's field of vision. For example, the new spatial area of attention can be behind the user. The user input can be used to focus audio attention away from visual attention. For example, EMG sensors in a virtual reality head-mounted display (HMD) can detect when the user is raising his or her eyebrows. In such examples, the magnitude of the eyebrow motion can be semantically mapped to the magnitude of directional rotation of audio attention. Alternatively, the user closing his or her eyes can be an indication to focus audio attention behind the user. As another example, a controller (not shown) could be mapped to a directional microphone metaphor, where the controller specifies parameters of the spatial area of audio attention (e.g., using controller direction).

Virtual avatars may also adapt to represent audio attention in a social virtual environment. For example, if a first person is focusing hard on a second person's voice, and the first person's modification of spatial audio is significant, that can be represented by the ears of a virtual avatar for the first person growing visually larger and being directed towards the second person. Alternatively, if the visual attention of the first person is directed at the second person, but the audio attention of the first person is wandering, that can be represented by directing the virtual ears of the virtual avatar for the first person towards the focus of the first person's audio attention.

FIG. 3 depicts a computer-readable storage medium 304 comprising instructions to modify audio based on physiological observations according to examples described herein. The computer-readable storage medium 304 is non-transitory in the sense that it does not encompass a transitory signal but instead is made up of storage components that store the instructions. The computer-readable storage medium may be representative of the memory resource 104 of FIG. 1 and may store machine-executable instructions in the form of modules or engines, which are executable on a computing device such as the computing device 100 of FIG. 1 and/or the computing device 200 of FIG. 2.

In the example shown in FIG. 3, the instructions include spatial area of attention instructions 310, enhancement instructions 312, suppression instructions 313, and physiological observation instructions 314. The instructions of the computer-readable storage medium 304 are executable to perform the techniques described herein, including the functionality described regarding the method 400 of FIG. 4 and/or the method 500 of FIG. 5. The functionality of these modules is described below with reference to the functional blocks of FIGS. 4 and 5 but should not be construed as so limiting.

In particular, FIG. 4 depicts a flow diagram of a method 400 that modifies audio based on physiological observations according to examples described herein. The method 400 is executable by a computing device such as the computing device 100 of FIG. 1 and/or the computing device 200 of FIG. 2. The method 400 is described with reference to the instructions stored on the computer-readable storage medium 304 of FIG. 3 and the components of the computing device 100 of FIG. 1 as an example but is not so limited.

At block 402 of FIG. 4, responsive to the spatial area of attention instructions 310 identifying the spatial area of attention 132 of a gaze of a user, the enhancement instructions 312 enhance audio associated with the spatial area of attention 132. At block 404, the enhancement instructions 312 modify the enhancing based at least in part on a physiological observation, performed by the physiological observation instructions 314, of the user while hearing the audio. In examples, the physiological observation includes an observation of at least one of a pupil dilation of the user, a heart rate of the user, a galvanic skin response of the user, or a facial expression of the user Additional processes also may be included. For example, the method 400 can include the spatial area of attention instructions 310 identifying the spatial area of attention 132 of the gaze of the user by tracking an eye movement of an eye of the user. In another example, the method 400 can include the suppression instructions 313 suppressing audio associated with an area 134 of attention other than the spatial area of attention 132 and modifying the suppressing based at least in part on the physiological observation of the user.

In yet another example, the method 400 can include the spatial area of attention instructions 310 identifying a new spatial area of attention responsive to detecting a change of the gaze of the user. In examples, the enhancement instructions 312 enhance audio associated with the new spatial area of attention modify the enhancing of the audio associated with the new spatial area of attention based at least in part on a second physiological observation, performed by the physiological observation instructions 314, of the user while hearing the audio associated with the new spatial area of attention. In examples, the suppression instructions 313 suppress audio associated with the new spatial area of attention and modify the suppressing of the audio associated with the new spatial area of attention based at least in part on a second physiological observation, performed by the physiological observation instructions 314, of the user while hearing the audio associated with the new spatial area of attention.

It should be understood that the processes depicted in FIG. 4 represent illustrations and that other processes may be added or existing processes may be removed, modified, or rearranged without departing from the scope of the present disclosure.

FIG. 5 depicts a flow diagram of a method 500 that modifies audio based on physiological observations according to examples described herein. The method 500 is executable by a computing device such as the computing device 100 of FIG. 1 and/or the computing device 200 of FIG. 2. The method 500 is described with reference to the instructions stored on the computer-readable storage medium 304 of FIG. 3 and the components of the computing device 100 of FIG. 1 as an example but is not so limited.

At block 502, responsive to the spatial area of attention instructions 310 identifying a spatial area of attention 132 of a gaze of a user, the suppression instructions 313 suppress audio associated with an area 134 other than the spatial area of attention 132. At block 504, the suppression instructions 313 modify the suppressing based at least in part on a physiological observation, performed by the physiological observation instructions 314, of the user while hearing the audio.

Additional processes also may be included, and it should be understood that the processes depicted in FIG. 5 represent illustrations and that other processes may be added or existing processes may be removed, modified, or rearranged without departing from the scope of the present disclosure.

FIG. 6 depicts a flow diagram of a method 600 that modifies audio based on physiological observations according to examples described herein. The method 600 is executable by a computing device such as the computing device 100 of FIG. 1 and/or the computing device 200 of FIG. 2.

In the example of FIG. 6, physiological signals are received by a cognitive load module 602.

Examples of physiological signals are received from signals that monitor and observe physiological responses from a user and can include EEG, PPG, EMG, fMRI, pupil dilation, gaze direction, etc. and combinations thereof.

The cognitive load module 602 uses the physiological signals to determine a cognitive stress/load on the user. The physiological signals can be used to detect if a user is struggling to understand or recognize an audio signal within a spatial area of attention by estimating cognitive workload of the user based on pupil dilation, heart rate, or galvanic skin response, for example. In response to low intelligibility/understanding of an audio signal, the audio can be dynamically modified to enhance intelligibility, for example, by amplifying an audio source (e.g., a speaker's voice) associated with the spatial area of attention 132 and/or by suppressing an audio source (e.g., background noise) associated with an area 134 other than the spatial source of attention 132.

As an example, if an EEG indicates brain wave patterns that indicate a user is under high cognitive load relative to normal, the cognitive load module 602 determines that additional audio enhancing and/or suppressing is useful to increase the user's hearing and/or understanding of the audio. Similarly, if the user's gaze, as determined using eye tracking techniques, is fixed on the spatial area of attention 132 for an extended period (e.g., in excess of a threshold period of time), the cognitive load module 602 determines that the user is highly focused on the spatial area of attention 132 and that additional audio enhancing and/or suppressing is useful to the user.

The HRTF and spectral/loudness module 604 receives results from the cognitive load module 602 as well as location information. The location information can include head orientation information from sensors of an HMD, for example. The location information can also include the location/position of the source of the audio.

The HRTF and spectral/loudness module 604 uses the cognitive load module 602 results and the location information to generate signals to an audio device (e.g., the audio device 140 of FIG. 1), which generates the audio accordingly. In particular, the HRTF and spectral/loudness module 604 creates delays and signal attenuation to help a user perceive the distance and direction of an audio source. The present techniques aid in increasing a user's hearing/understanding of audio by observing physiological responses of the user and using those physiological responses to generate audio signals at the HRTF and spectral/loudness module 604.

It should be emphasized that the above-described examples are merely possible examples of implementations and set forth for a clear understanding of the present disclosure. Many variations and modifications may be made to the above-described examples without departing substantially from the principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A non-transitory computer-readable storage medium comprising instructions that, when executed by a processing resource of a computing device, cause the processing resource to:
responsive to identifying a spatial area of attention of a gaze of a user, enhance audio associated with the spatial area of attention;
modify the enhancing based at least in part on a physiological observation of the user while hearing the audio, the physiological observation including an estimation of a cognitive workload of the user;
identify a new spatial area of attention based on a user input, the new spatial area of attention being an area not within a present field of vision of the user;
enhance audio associated with the new spatial area of attention; and
modify enhancing the audio associated with the new spatial area of attention based at least in part on a second physiological observation of the user while hearing the audio associated with the new spatial area of attention.

2. The non-transitory computer-readable storage medium of claim 1, wherein the physiological observation comprises an observation of at least one of a pupil dilation of the user, a heart rate of the user, a galvanic skin response of the user, a facial expression of the user, or brain activity of the user.

3. The non-transitory computer-readable storage medium of claim 1, wherein the instructions further cause the processing resource to identify the spatial area of attention of the gaze of the user by tracking an eye movement of an eye of the user.

4. The non-transitory computer-readable storage medium of claim 1, wherein the instructions further cause the processing resource to:
suppress audio associated with an area other than the spatial area of attention; and
modify the suppressing based at least in part on the physiological observation of the user.

5. The non-transitory computer-readable storage medium of claim 1, wherein the instructions further cause the processing resource to:
responsive to detecting a change of the gaze of the user, identifying an other new spatial area of attention.

6. The non-transitory computer-readable storage medium of claim 5, wherein the instructions further cause the processing resource to:
enhance audio associated with the other new spatial area of attention; and
modify the enhancing of the audio associated with the other new spatial area of attention based at least in part on a third physiological observation of the user while hearing the audio associated with the other new spatial area of attention.

7. The non-transitory computer-readable storage medium of claim 5, wherein the instructions further cause the processing resource to:
suppress audio associated with the other new spatial area of attention; and
modify the suppressing of the audio associated with the other new spatial area of attention based at least in part on a third physiological observation of the user while hearing the audio associated with the new spatial area of attention.

8. A computing device comprising:
a display; and
a processing resource to:
present a virtual reality interface on the display;
identify a spatial area of attention of a gaze of a user with respect to the virtual reality interface by tracking an eye movement of an eye of the user;
adjust audio associated with the virtual reality interface by enhancing audio associated with the spatial area of attention and by suppressing audio associated with an area other than the spatial area of attention;
modify at least one of the enhancing or suppressing based at least in part on a physiological observation of the user while hearing the audio;
identify a new spatial area of attention based on a user input, the new spatial area of attention being an area not within a present field of vision of the user;
enhance audio associated with the new spatial area of attention;
suppress audio associated with an area other than the new spatial area of attention; and
modify at least one of the enhancing the audio associated with the new spatial area of attention or suppressing the audio associated with the area other than the new spatial area of attention based at least in part on a second physiological observation of the user while hearing the audio associated with the new spatial area of attention.

9. A method comprising:
responsive to identifying a spatial area of attention of a user, suppressing, by a computing device, audio associated with an area other than the spatial area of attention;
modifying, by the computing device, the suppressing based at least in part on a physiological observation of the user while hearing the audio, the physiological observation including an estimation of a cognitive workload of the user;
identifying, by the computing device, a new spatial area of attention based on a user input, the new spatial area of attention being an area not within a present field of vision of the user;
suppressing, by the computing device, audio associated with an area other than the new spatial area of attention; and
modifying, by the computing device, suppressing the audio associated with the area other than the new spatial area of attention based at least in part on a second physiological observation of the user while hearing the audio associated with the new spatial area of attention.

10. The method of claim 9, wherein the physiological observation comprises an observation of at least one of a pupil dilation of the user, a heart rate of the user, a galvanic skin response of the user, a facial expression of the user, or brain activity of the user.

11. The method of claim 9, further comprising identifying the spatial area of attention of the user based on a gaze of the user determined by tracking an eye movement of an eye of the user or based on a head direction of the user determined by detecting an orientation of a head of the user.

12. The non-transitory computer-readable storage medium of claim 1, wherein the instructions cause the processing resource to modify the enhancing by increasing the enhancing upon determining that the cognitive workload of the user is higher than a normal cognitive workload.

13. The computing device of claim 8, wherein the physiological observation comprises an observation of at least one of a pupil dilation of the user, a heart rate of the user, a galvanic skin response of the user, a facial expression of the user.

14. The method of claim 9, wherein modifying the suppressing based at least in part on a physiological observation of the user while hearing the audio includes increasing the suppressing upon determining that the cognitive workload of the user is higher than a normal cognitive workload.

* * * * *